US012467434B2

(12) United States Patent
Antonsen et al.

(10) Patent No.: US 12,467,434 B2
(45) Date of Patent: Nov. 11, 2025

(54) FIXATION ARRANGEMENT ADAPTED TO RELEASABLY FIX A WIND TURBINE TOWER SEGMENT TO A SUPPORT OF A TRANSPORT VESSEL

(71) Applicant: SIEMENS GAMESA RENEWABLE ENERGY A/S, Brande (DK)

(72) Inventors: Jacob Antonsen, Esbjerg (DK); Michael Bramm, Brørup (DK); Morten Fogh Jacobsen, Hjørring (DK); Soeren Majdal Kaarsholm, Copenhagen N (DK); Tom Nicolaisen, Auning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 874 days.

(21) Appl. No.: 17/703,634

(22) Filed: Mar. 24, 2022

(65) Prior Publication Data

US 2022/0307479 A1    Sep. 29, 2022

(30) Foreign Application Priority Data

Mar. 26, 2021    (EP) .................................... 21165172

(51) Int. Cl.
*F03D 13/40*    (2016.01)
*B25B 5/12*    (2006.01)
*B63B 25/00*    (2006.01)

(52) U.S. Cl.
CPC .............. *F03D 13/40* (2016.05); *B25B 5/122* (2013.01); *B63B 25/002* (2013.01); *F05B 2260/02* (2013.01)

(58) Field of Classification Search
CPC ..... F03D 13/40; F03D 13/402; B63B 25/002; B63B 25/28; F05B 2260/02; B25B 1/04;
(Continued)

(56) References Cited

U.S. PATENT DOCUMENTS

| 6,612,781 | B1 | 9/2003 | Jackson | |
|---|---|---|---|---|
| 2003/0132564 | A1* | 7/2003 | Steenwyk | B23Q 5/26 269/225 |
| 2023/0138486 | A1* | 5/2023 | Zanni | B25B 5/163 269/25 |

FOREIGN PATENT DOCUMENTS

| CN | 108730127 A | * 11/2018 | ............. Y02E 10/72 |
|---|---|---|---|
| CN | 209239380 U | * 8/2019 | ........... B23K 37/053 |

(Continued)

OTHER PUBLICATIONS

European Search Report dated Oct. 19, 2021 for Application No. EP 21165172.4.

*Primary Examiner* — Daniel J Colilla
(74) *Attorney, Agent, or Firm* — LADAS & PARRY LLP

(57) ABSTRACT

Fixation arrangement adapted to releasably fix a wind turbine tower segment (4) to a support (3) of a transport vessel (20), comprising at least two fixation means (2), wherein each fixation means (2) comprises a base member (6) fixed or to be fixed to the support (3), a lever arm (8) connected to the base member (2) and pivotable around a pivot axis (9), and a tensioning means (13) for clamping the lever arm (8) with a clamping section (10) against the tower segment (4), wherein the tensioning means (13) comprises at least one tensioning element (14) supported relative to the base member (6) and movable from a non-clamping position in a clamping position and back, wherein the tensioning element (14) directly or indirectly interacts with the lever arm (8) which is pivoted into a clamping engagement of the clamping section (10) with the tower segment (4) when the tensioning element (14) moves from a non-clamping position into a clamping position and which is released when the tensioning element (14) moves back to the non-clamping position.

22 Claims, 11 Drawing Sheets

Figure 1:
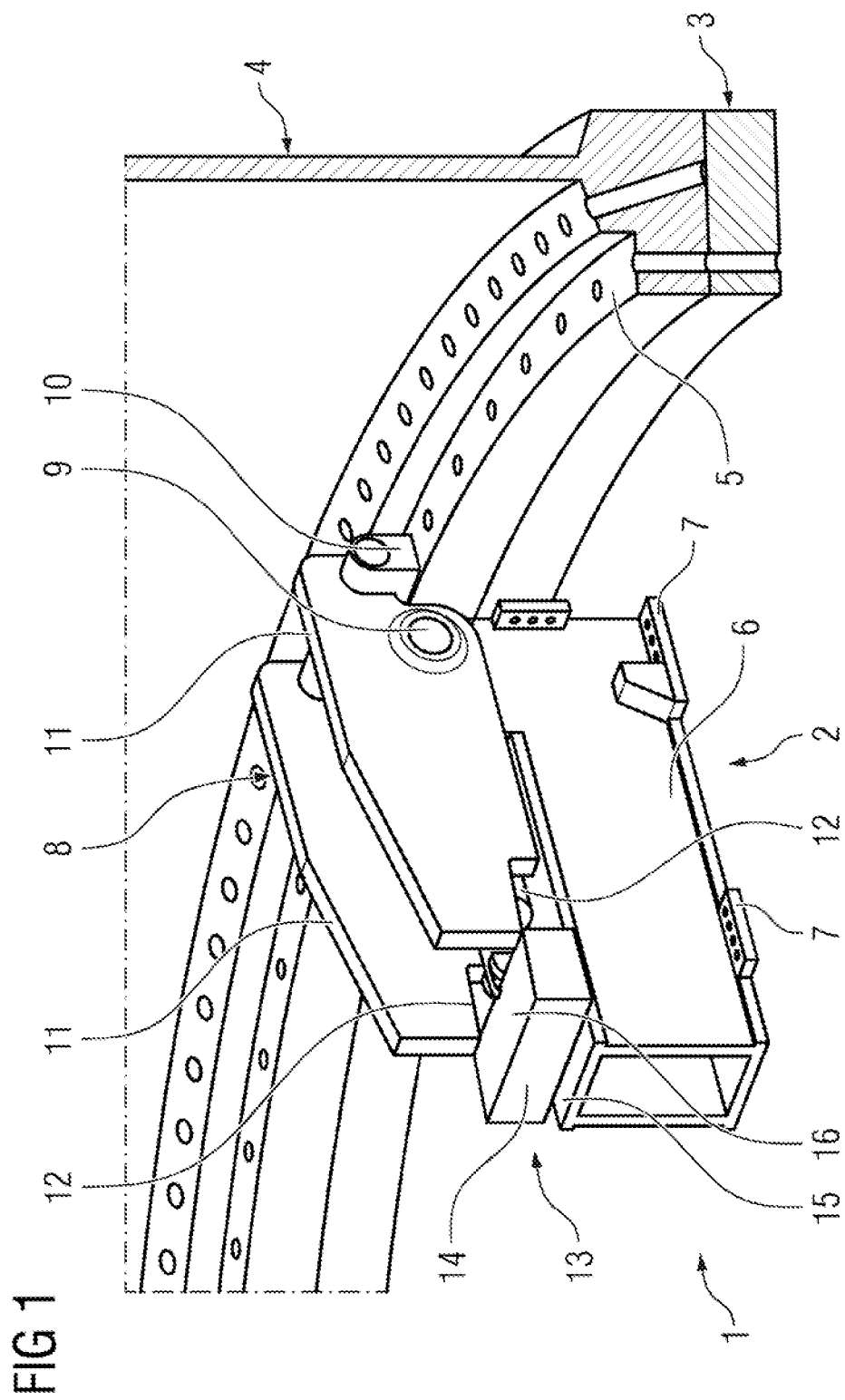

(58) Field of Classification Search
CPC .... B25B 1/08; B25B 1/14; B25B 5/04; B25B 5/12; B25B 5/122; B25J 15/0226; B23Q 3/062; B23Q 3/069; B23Q 3/082; B23Q 2703/02; B23Q 2703/04; B23Q 2703/10; B64D 9/003

See application file for complete search history.

(56) References Cited

FOREIGN PATENT DOCUMENTS

| DE | 202010017426 U1 * | 2/2012 | ............. B60P 7/132 |
|---|---|---|---|
| DE | 102012003571 A1 * | 3/2013 | ............. B63B 25/28 |
| EP | 2754783 A1 | 7/2014 | |
| EP | 2595903 B1 | 2/2016 | |
| EP | 2444656 B1 * | 10/2018 | ............. B65D 85/68 |
| KR | 20190021715 A * | 3/2019 | ........... B63B 25/002 |
| SU | 1004068 A1 * | 3/1983 | |

* cited by examiner

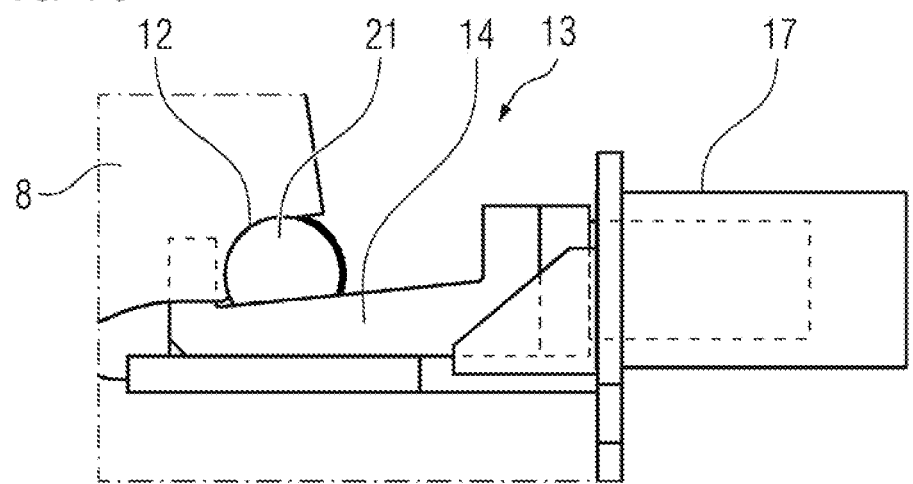
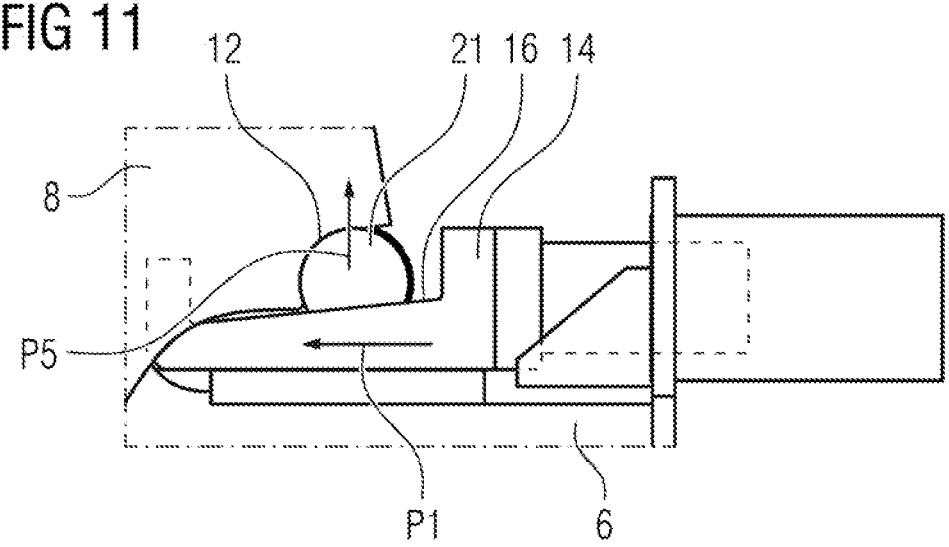

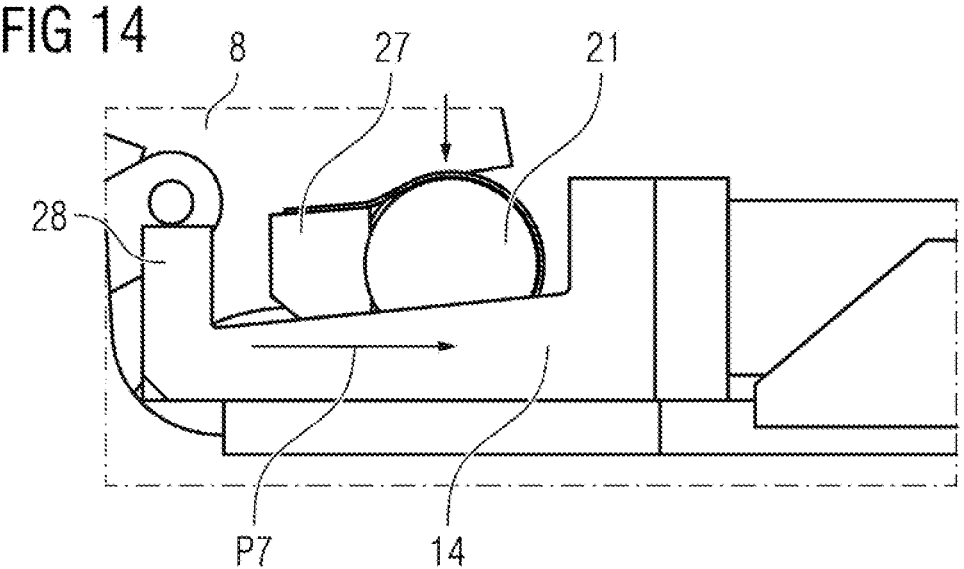
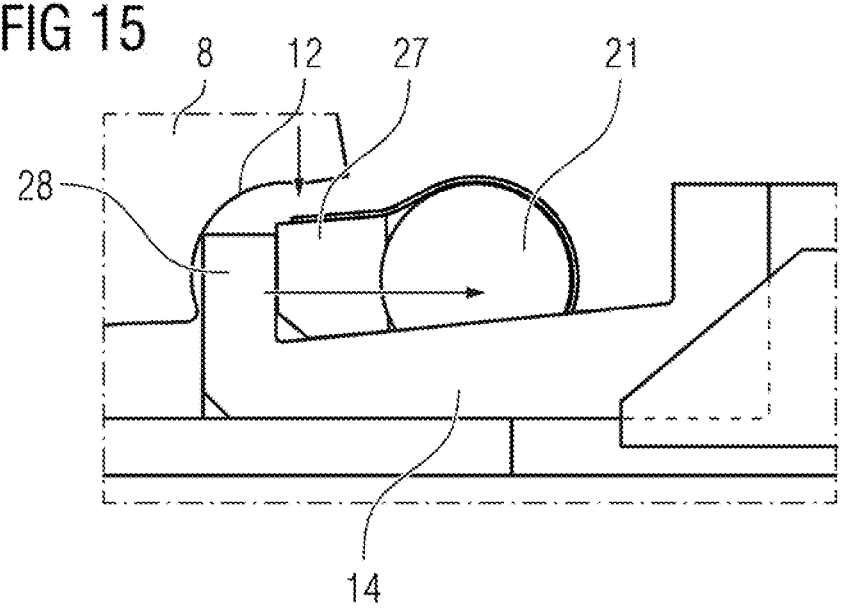

FIXATION ARRANGEMENT ADAPTED TO RELEASABLY FIX A WIND TURBINE TOWER SEGMENT TO A SUPPORT OF A TRANSPORT VESSEL

The invention relates to a fixation arrangement adapted to releasably fix a wind turbine tower segment to a support of a transport vessel.

Beside the onshore installation of wind turbines it is also known to have offshore installations of wind turbines, either in larger seas or in the ocean. In the latter case it is necessary to transport the needed wind turbine parts to the installation side on a transport vessel. Among the parts to be transported is the tower segment, which tower segment may be the main tower segment or monopile, or which may be one of several finally stacked tower segments. This tower segment is fixed to the transport vessel by a large number of bolts, which connect the tower segment to a respective support of the transport vessel. This bolt arrangement ascertains a very secure fixation of the tower segment, which is necessary, as during the transport over the water the swimming vessel moves in random directions due to the wavy water. It is subjected to sway, surge, roll, pitch or yaw motion.

The transport vessels used for transporting the vertically arranged tower segment are adapted with jack-up means, which allow to fixe the vessel at the offshore installation site, which itself is not floating. Ry these jack-ups, when engaged, the movement of the transport vessel is reduced, when the tower segment, which as mentioned may be a monopile or a transition segment, is lifted from the transport vessel to the installation site by a fixed crane lift. For allowing this lifting it is necessary to unbolt all the bolt fixations, which takes a remarkable amount of time. But as the transport vessel is jacked-up at the installation side, this unbolting is possible.

The transport vessels comprising the jack-up fixation means are quite large vessels and specifically equipped with the jack-up fixation means. It is desirable to use smaller vessels without any jack-up fixation means, which would make the transport and transfer more cost-effective. Nevertheless this is not possible, as the vessel moves during the unbolting and lifting process, especially in a vertical direction due to the chop, while it also rolls and pitches etc. The unbolting process is dangerous and unacceptable if the vessel moves too much, because all the bolts cannot be loosened at the same time with the lifting of the tower happening immediately thereafter. The unbolting process takes time, and with a decreasing number of fastened bolts, the fastening of the tower reduces with every bolt that is removed. At some point during this extended period of time, the tower segment will no longer be sufficiently sea fastened and a risk is given that the tower segment may fall over due to the forces induced into the tower segment by the movement of the ship.

It is therefore an object of the invention to provide an improved fixation arrangement.

For addressing this object the invention provides a fixation arrangement adapted to releasably fix a wind turbine tower segment to a support of a transport vessel, comprising at least two fixation means, wherein each fixation means comprises a base member fixed or to be fixed to the support, a lever arm connected to the base member and pivotable around a pivot axis, and a tensioning means for clamping the lever arm with a clamping section against the tower segment, wherein the tensioning means comprises at least one tensioning element supported relative to the base member and movable from a non-clamping position in a clamping position and back, wherein the tensioning element directly or indirectly interacts with the lever arm, which is pivoted into a clamping engagement of the clamping section with the tower segment when the tensioning element moves from a non-clamping position into a clamping position and which is released when the tensioning element moves back to the non-clamping position.

The inventive fixation arrangement comprises at least two, preferably certainly more separate fixation means. These fixation means are arranged or are to be arranged at the support, to which the tower segment shall be fixed. If more than two fixation means are arranged, they are arranged on a common radius, as the tower segment has usually a cylindrical form. The fixation means may for example engage with a radial flange of the tower segment extending to the inner of the tower, therefore the fixation means are arranged in the inner of the tower segment, when the tower segment is placed on the support.

Each fixation means is adapted to clamp the tower segment to the support by a lever arm, which comprises a clamping section. The lever arm is movable between a non-clamping position, in which it does not engage the tower segment clamping section, and a clamping position, in which engages the tower segment clamping section. For moving the lever arm between these two positions back and forth, a tensioning means is provided, which comprises at least one tensing element, which is movable, but which is supported relative to the base member. This tensioning element is also movable between a non-clamping position, in which it does not engage with the lever arm, and a clamping position, in which engages with the lever arm and actively pivots the lever arm around the pivot axis into the lever arm clamping position. Thus, the tensioning element directly or indirectly interacts with the lever arm for moving it into the clamping position. On the other hand, when the tensioning element is moved back from the clamping position in the non-clamping position, the lever arm is released and may also return to a non-clamping position, thereby releasing the tower segment.

This clamping fixation can on the one hand quickly be realised, as it is only necessary to move the tensioning element from the non-clamping position and the clamping position, thereby moving the lever arm with its clamping section against the tower segment. It also very quickly allows to release this clamping fixation again by simply moving the tension element back to the non-clamping position, thereby releasing the lever arm, which in turn releases the tower segment.

The movement of the tensioning element is preferably automatically controlled, for example by means of a respective hydraulic or pneumatic cylinder, which moves it actively between the two respective non-clamping and clamping positions. This allows to very quickly clamp the tower section, but also to very quickly release the tower section.

When all fixation means are simultaneously controlled, it is therefore possible to very quickly realise an overall fixation of the tower segment around its inner or outer circumference, depending on where the fixation means and the tower section clamping section is arranged. This in turn allows for a very quick loading process for loading the tower segment from the quay on the support of the vessel. On the other hand, and even more important, it allows for a very quick release of the tower section clamp fixation, as all fixation means are simultaneously controlled to move all tensioning elements back to the non-clamping position, thereby releasing all lever arms, which are no longer clamped and can therefore be moved out of the clamping position. The tower section is therefore released almost from one second to the other and may be lifted.

This quick clamp and release now allows to also use smaller and simpler transport vessels without any jack-up fixation means, which also move during the unloading process at the installation site. It is only necessary to simultaneously control all fixation means for releasing the clamps, while the tower segment is already fixed to the lifting crane. This simultaneous control and release may be performed in a correct position window, in which the moving vessel is for example in a higher vertical position due to the chop. If the clamps are now released, and if the vessel lowers afterwards, the tower segment is hanging on the lifting crane and may easily be lifted.

The inventive fixation arrangement, attached to a transport vessel, therefore allows to use simple transport vessels and to especially unload at the offshore construction site with the not jacked-up and therefore floating or moving vessel, as the fixation arrangement especially allows for a very quick release of the tower segment fixation.

The function of each fixation means is based on the movable tensioning element interacting with the lever arm with the clamping section. In a first embodiment the tensioning element is releasably movable into at least one recess provided at the lever arm, wherein the tensioning element and the recess comprise interacting surfaces with at least one surface being slanted, so that by the interaction of the surfaces during the movement of the tensioning element into the recess the lever arm is pivoted around the pivot axis. According to this embodiment the tensioning element itself is directly moved into the at least one or, depending on the setup of the lever arm, more recesses. The surfaces, at least one of which is slanted, interact during this engaging movement. This makes the lever arm rotate around the pivot axis to a certain degree and, due to the interacting slanted surfaces, firmly clamp the lever arm against the tower section, depending on the movement of the tensioning element. Any angle larger than 0° and smaller than 90° may be chosen, wherein the chosen angle will depend on the project specific load scenario. The angle directly affects the force multiplication, the friction lock quality and the length of the tensioning element respectively the wedge or ramp. Preferably the angle of the slanted surface or surfaces is quite small, preferably between 1°-5°, and especially between 2°-4°, so that it can translate a horizontal force into a vertical force swivelling the lever arm around the pivot axis, and thereby increase the horizontal force for multiple times. On the other hand, such a low angle results in a high horizontal friction force, which ascertains that this clamping engagement is self-secured. As mentioned, the slanted surface may either be provided at a recess surface or, preferably, at the tensioning element, which has therefore a wedge-like cross section.

As explained, in this first embodiment the tensioning element is directly moved into the recess and therefore directly interacts with the lever arm. According to a second alternative embodiment the tensioning element comprises a slanted surface, wherein the tensioning means further comprises a tensioning pin movable on the slanted surface of the tensioning element from a non-engaging position into an engaging position, in which it engages at least one recess provided at the lever arm, wherein the tensioning element, when moved from the non-clamping position into the clamping position, interacts with the tensioning pin which in turn interacts with the lever arm. According to this embodiment, the tensioning element indirectly interacts with the lever arm, as it interacts via the tensioning pin. The tensioning element again comprises a slanted surface, on which the tensioning pin moves. When the tensioning pin is engaging the recess and the tensioning element moves, the slanted surface interacts with the pin, which in turn is moved vertically and acts on the lever, which pivots around its axis and is clamped against the tower section. Again, the angle of the slanted surface is preferably small, preferably 1°-5°, especially 2°-4°, allowing a multiplied translation of the horizontal force into the vertical force urging on the lever arm. Nevertheless it needs to be noted, that depending on the specific load scenario also larger angles smaller than 90° and preferably smaller than 45° may be chosen, which also fulfil the demands regarding the force multiplication and friction lock characteristics.

The tensioning pin itself is preferably cylindrical with a flat bottom surface sliding on the slanted surface, wherein the recess is at least in part form adapted to the cylindrical shape of the pin. The cylindrical shaped pin engages in the recess in a form-fit manner. Due to the rotation of the lever arm around the pivot axis, when the tensioning element moves, the lever arm slightly changes its position relative to the tensioning pin. Due to the form fit of the cylindrical surface and the at least in part rounded recess, there is always a constant interaction area between the tensioning pin and the recess respectively the lever arm, avoiding any point loads. And the point of loading on the lever arm also remains almost constant during the movement of the tensioning element, which substantially keeps the lever arm ratio constant throughout the loading and unloading process.

In the first embodiment mentioned above the tensioning element engages in the recess, which tensioning element is actively moved in and out of the recess, the release of the lever arm is simply performed by pulling the tensioning element back to the non-clamping position. In the second embodiment, the tensioning pin engages in the recess. For releasing the lever arm it is therefore necessary to remove the tensing pin from the recess. For this purpose the tensioning element preferably comprises a catch adapted to disengage the tensioning pin from the recess when the tensioning element moves from the clamping position in the non-clamping position.

Thus, when the tensioning element is actively moved out of the clamping position, the catch engages the tensioning pin, which in turn moves together with the tensioning element and is pulled out of the recess, thereby releasing the lever arm and the clamping of the tower section. This catch may be a simple vertical pin or flange or the like arranged at the tensioning element at a position, in which it runs against the tensioning pin, when the tensioning element is moved backwards.

As the tensioning element moves linearly, when the tensioning pin is engaging the recess, the catch provided at the tensioning element therefore moves away from the tensioning pin.

A certain gap is given between the catch and the tensioning pin, when the tensioning element is in its final clamping position. In order to release the lever arm as quick as possible, according to an embodiment of the invention the tensioning pin comprises a distance element preferably rotatably arranged at the pin and adapted to move, preferably rotate from a first lifted position in a second lowered position in which it is arranged between the pin and the catch. This distance element bridges the gap between the catch and the tensioning pin. When now the tension element moves from the clamping position, the catch almost immediately engages with the pin by the pin distance element, and therefore immediately pushes the tensioning pin out of the recess, right after the movement of the tensioning element has started.

In the second embodiment, the tensioning pin, as mentioned, moves from a starting position into an end position, in which it engages in the recess. During this movement it moves on the slanted surface of the tensioning element. To actively move the tensioning pin, the tensioning pin is preferably moved by an elastic spring means from the non-engaging position in the engaging position. This elastic spring means, for example a helical string, is attached with one end to the tensioning pin and with the other end to a respective support, for exampling provided at the base member or any other non-moving part of the fixation means. When the tensioning pin is in the non-engaging position, the spring is compressed. If the pin shall be moved, which pin in this non-engaging position is for example locked by a respective movable locking pin or the like, this lock is released and the tensioning pin is immediately pushed by the expanding spring into the recess. When the tensioning element finally returns for releasing a former clamping, the pin is pushed against the spring, which again is compressed. When the tensioning pin moves in the non-engaging position, the lock is again activated, if such a lock is provided.

If a distance element is provided, also this distance element is preferably automatically moved from the first in the second position and back. This may for example be realised by a mechanical forced guidance. The pivotable distance element is for example coupled to a respective guidance groove or the like by an engaging means like a pin. When the tensioning pin is in the engaging position, the distance element is still in the upper first position. When now the tension element moves, the distance element is slowly pivoting to the lowered second position driven by the mechanical forced guidance. When the tensioning element reached its final clamping position, the distance element latest is in the second position bridging the gap between the catch and the tensioning pin. The mechanical guidance is now for example disengaged, allowing that the catch, when the tensioning element is moved back to the non-clamping position, abuts against the distance element remaining in the lowered second position, until the whole tensioning means again reaches the non-clamping position. For another turn, the mechanical forced guidance is again engaged. Aside this mechanical forced guidance, it is also possible to use any kind of spring element arrangement or even a small plunger cylinder or the like.

The recess itself is preferably provided at a first end of the lever arm and the clamping section is arranged at the other end of the lever arm, with the pivot axis being arranged between the first and the second end. So the vertical force pivoting the lever arm is introduced at the first end, while the clamping force is introduced in the tower section at the other end. The pivot axis is preferably arranged closer to the second end than to the first end, so that the lever arm portion running from the pivot axis to the clamping section is shorter than the lever arm portion running from the pivot axis to the recess end. This also allows for a very good force translation and multiplication.

The tensioning element itself, as already mentioned, has preferably a wedge-like cross section comprising a bottom surface and a top surface, which top surface is a slanted surface. The tensioning element rests on the support member with the bottom surface, on which support member it slides. A linear sliding bearing may be provided to ascertain an easy movement of the tensioning element. Such a linear sliding bearing may also be provided on the slanted surface of the tensioning element, on which the tensioning pin, if provided, slides.

As also mentioned, the angle of the slanted surface, preferably the angle of the wedge-like tensioning element between the slanted surface and the bottom surface, is smaller than 90°, especially smaller than 45° and may measures preferably between 1°-5°, preferably 2°-4°. This small angle, especially in combination with the longer lever arm section at the recess end compared to the opposite lever arm section, allows for a very good force translation and multiplication by a certain ratio. For example, with an angle of 4°, the horizontal force may be increased by a ration of approximately 1:2.5 for example. Another feature of the wedge design and the little angle are the mechanical locking capabilities. Using a low angle results in a much higher horizontal friction force than the horizontal force translated through the vertical force induced by the tower loading from the sea motion and wind. This means that, once inserted, the wedge arrangement cannot be removed by the force applied to the lever arm through the motion of the tower alone, but external forces must be applied to overcome the translated force and the friction for loosing the clamping engagement respectively the wedge engagement. Therefore this wedge clamping arrangement is self-secured respectively locks itself.

As mentioned, the tensioning element is preferably movably supported directly on the base member in order to keep the setup simple. A smooth movement may either be provided by a certain lubrication or, additionally, by providing a sliding bearing arrangement between the base member and the tensioning element.

For actively moving the tensioning element preferably a controllable hydraulic or pneumatic cylinder means is used. This cylinder means is coupled with its movable plunger to the tensioning element. The cylinder means is designed to provide the necessary horizontal force for moving the tensioning element horizontally and for firmly pushing it under the lever arm, either directly in the recess or under the tensioning pin engaged in the recess. The cylinder means is certainly controllable in both ways, so that the plunger can again be actively moved back in the cylinder, moving the tensioning element from the clamping position to the non-clamping position.

Preferably all fixation means are provided with such a hydraulic or pneumatic cylinder means, which cylinder means are all simultaneously controllable by a respective control means integrated in the respective hydraulic or pneumatic circuit. This allows for simultaneously moving the tensioning element from the non-clamping position in the clamping position and therefore for simultaneously clamping the tower sections at all fixation points, so that from one moment to the other the tower segment is fixed around its whole circumference. On the other hand, this common control also allows to simultaneously move all tensioning elements from the clamping position to the non-clamping position, thereby releasing the lever arms simultaneously, so that the clamping of the tower section is also released from one moment to the other around its circumference at all fixation points.

As mentioned, when the lever arm is released, it no longer actively clamps on the tower section. If all lever arms are released, it would be possible that they maintain in their unclamped position resting on the tower section. If the tower section is now lifted, the tower section itself moves the lever arms around their pivot axis, until the tower section is lifted enough and the lever arms finally disengage the tower section. Alternatively, according to the invention, the lever arm is adapted to gravity driven move around the pivot axis from the clamping position into a non-working position, when being released from the tensioning element, preferably after removing the tensioning element or the tensioning pin from the recess. According to this embodiment, as soon as the lever arm is released from the introduced clamping force, the lever arm itself automatically pivots around the axis solely gravity driven. This may easily be realised by using a lever arm having different long lever arm sections, with a longer section extending from the pivot axis to the recess end. This lever arm section is heavier than the other lever arm section, therefore easily allowing the gravity driven lever arm motion.

In this non-working position, the lever arm may abut against a stop block defining the non-working position. In this position the recess is in a position, in which it is not possible to either engage the tensioning element itself or the tensioning pin. To bring the lever arm back in a non-clamping position, in which its recess may be engaged by the tensioning element or the tensioning pin, preferably the lever arm is movable by means of a controllable hydraulic or pneumatic cylinder means from the non-working position into a position allowing the movement of the tensioning element into the recess. In this position, the clamping section of the lever arm is already positioned above and close to the flange of the tower section, on which the clamping section shall be pressed later. Therefore, in this embodiment the lever arm movement in the one pivoting direction is gravity driven and in the other actively performed by the cylinder means.

In an alternative to this embodiment, the lever arm may be movable by a hydraulic or pneumatic cylinder means from the clamping position into the non-working position after removing the tensioning element or the tensioning pin from the recess and from the non-working position into a position allowing the movement of the tensioning element or the tensioning pin into the recess. According to this embodiment, the lever arm will automatically be moved in both directions by the respective cylinder means. No matter which embodiment is provided, in any case the final force for clamping the lever arm respectively its clamping section against the tower section is provided by the tensioning element.

As mentioned, the tower section is arranged on a support of the vessel, to which support also the fixation arrangement is attached. This support may be a grillage to which the fixation means are fixed. This grillage is adapted to be fixed to the transport vessel. The fixation means are fixed to the grillage in a ring-form. Depending on the diameter of the tower section the number of fixation means is chosen. For example ten fixation means are used for smaller sections, while sixteen fixation means are used for larger tower sections.

It is possible to design the grillage and the arrangement of the fixation means for only one certain tower section design, so that only tower sections having the same diameter may be fixed and transported. For realising a multi-purpose support design it is possible that the fixation means are linearly and radially movable arranged on guide rails. The guide rails are arranged at the support respectively the grillage. This allows to change the radial position of all fixation elements and therefore allowing to narrow or widen the clamping diameter of the fixation arrangement, which in turn allows to fix smaller tower sections with smaller diameters as well as larger tower sections with larger diameters, as the clamping diameter of the fixation arrangement may be adapted accordingly.

Besides the fixation arrangement the invention also refers to a transport vessel, comprising a fixation arrangement as described above.

Finally, the invention also refers to a method for transporting a wind turbine tower segment with a fixation arrangement as previously described arranged at the vessel, wherein the tower segment is positioned on the support of the vessel relative to the fixation arrangement and fixed by moving the tensioning elements from the non-clamping position into the clamping position, thereby clamping the lever arms against an engagement section of the tower segment, and wherein the tower section is released by moving the tensioning elements from the clamping position into the non-clamping position, thereby releasing the clamping of the lever arms.

According to a further embodiment the tensioning elements and the lever arms are automatically moved by controlling the cylinder means with a control means, wherein the lever arms either pivot gravity driven from the clamping position in the non-clamping position or are automatically moved by controlling a respective cylinder means from the clamping position into the non-clamping position.

Finally the respective same cylinder means of all fixation means are simultaneously controlled in order to simultaneously clamp or release all fixation means.

Figure 2:
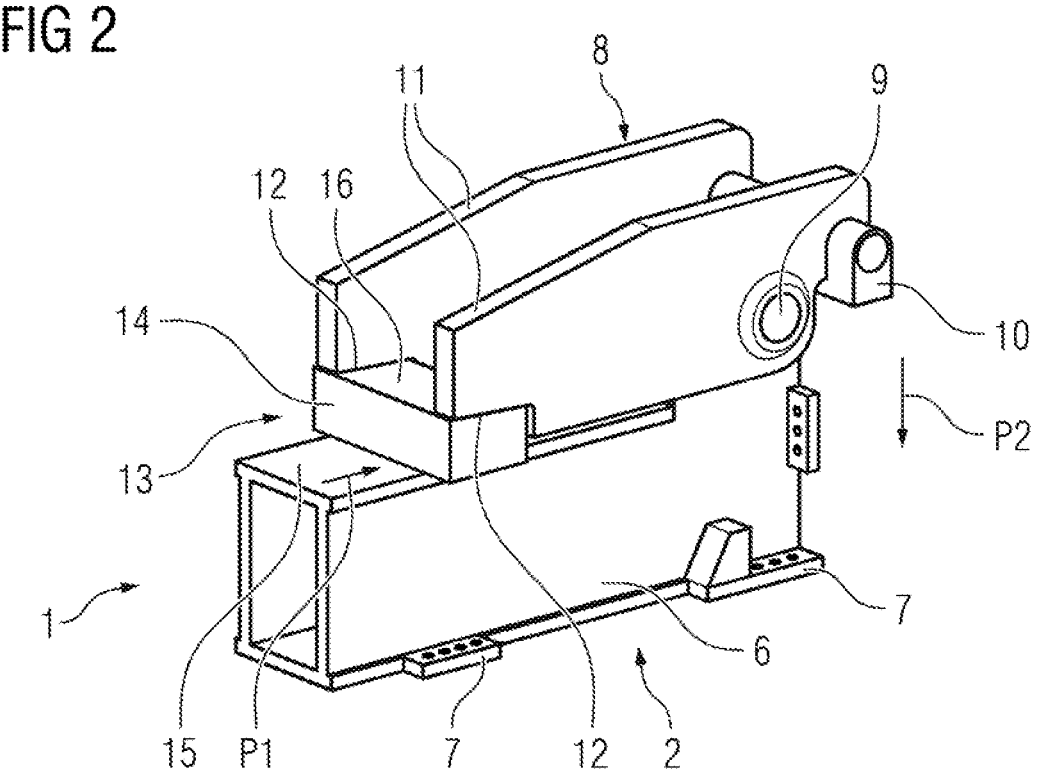
Figure 3:
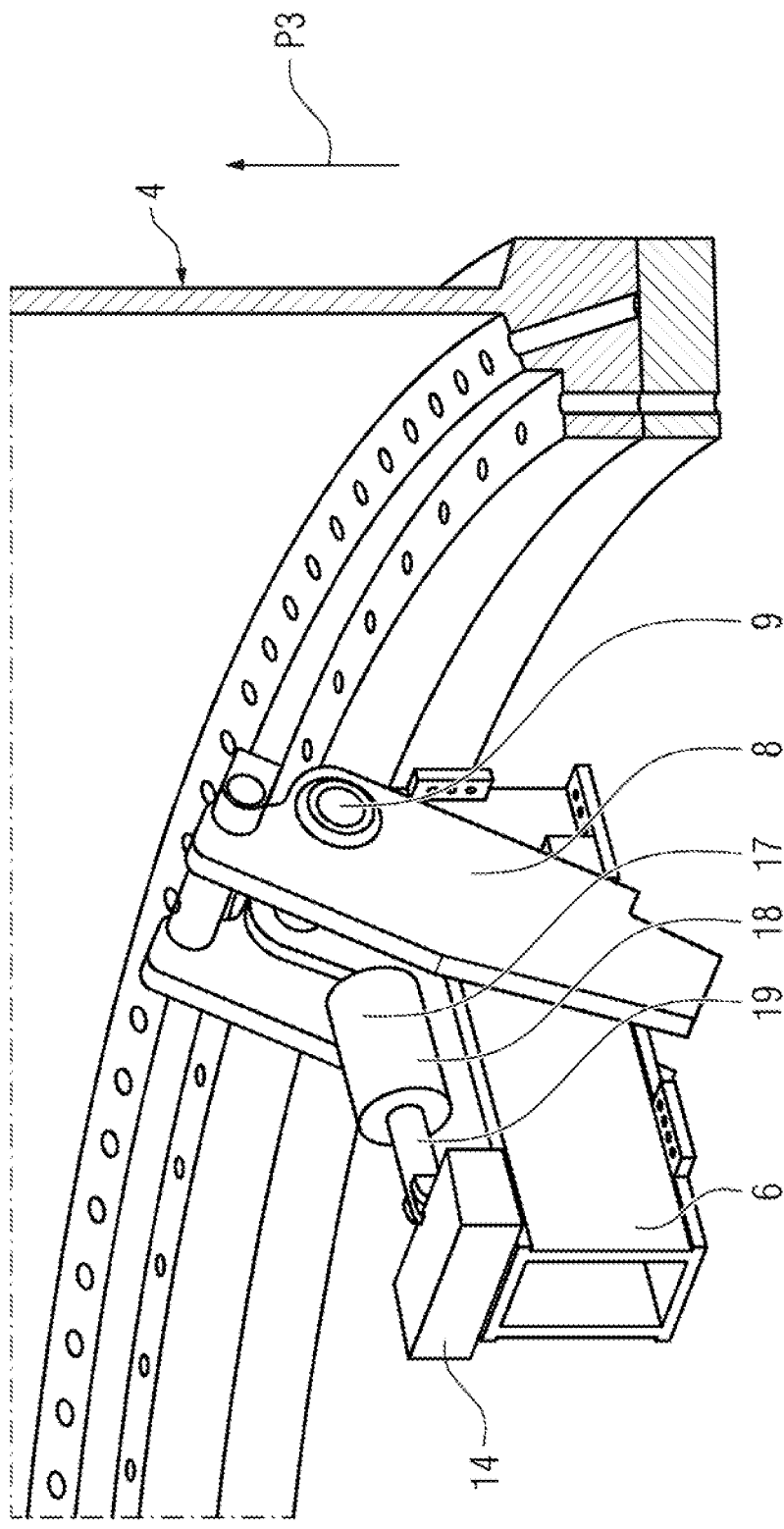
Figure 4:
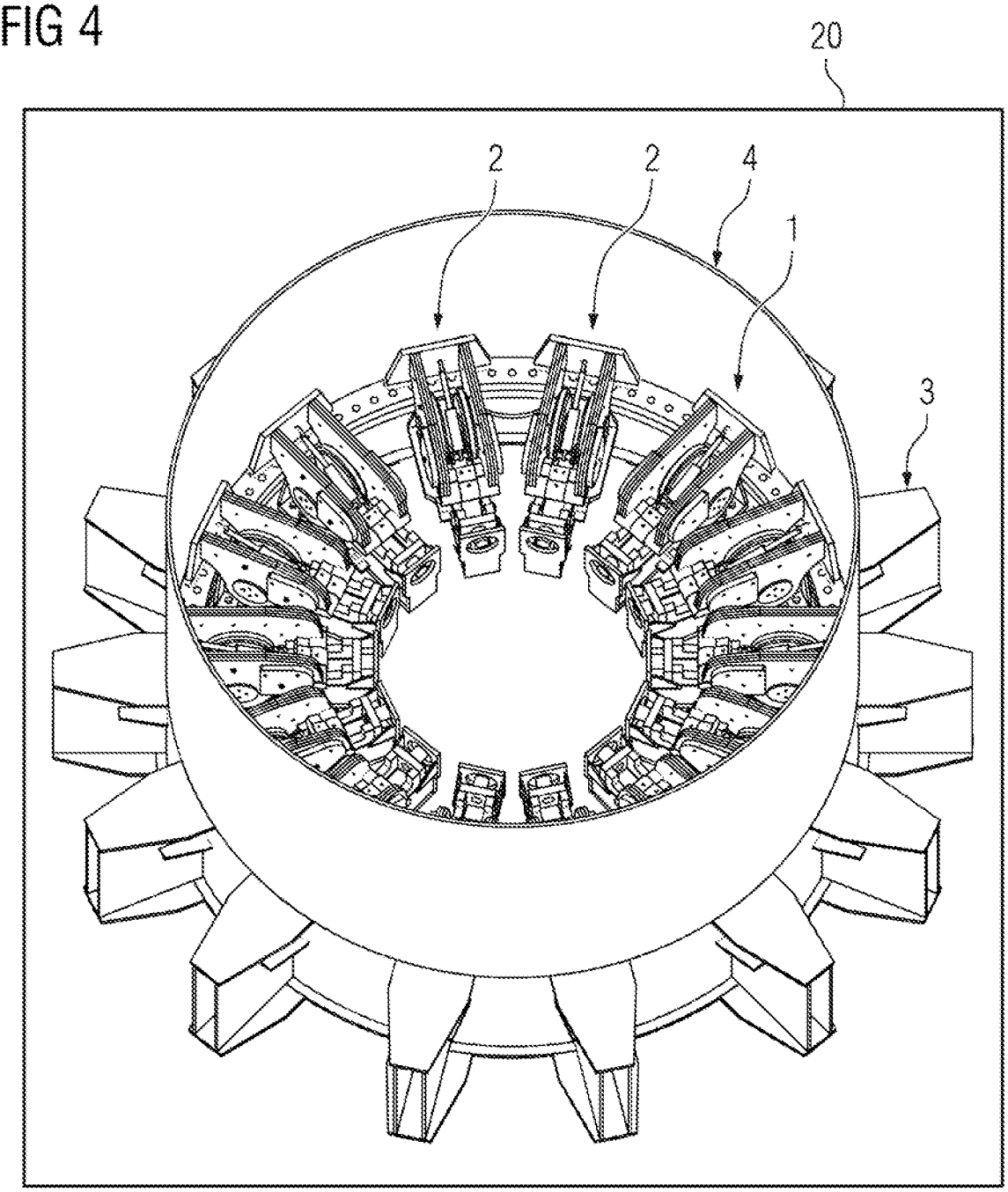
Figure 5:
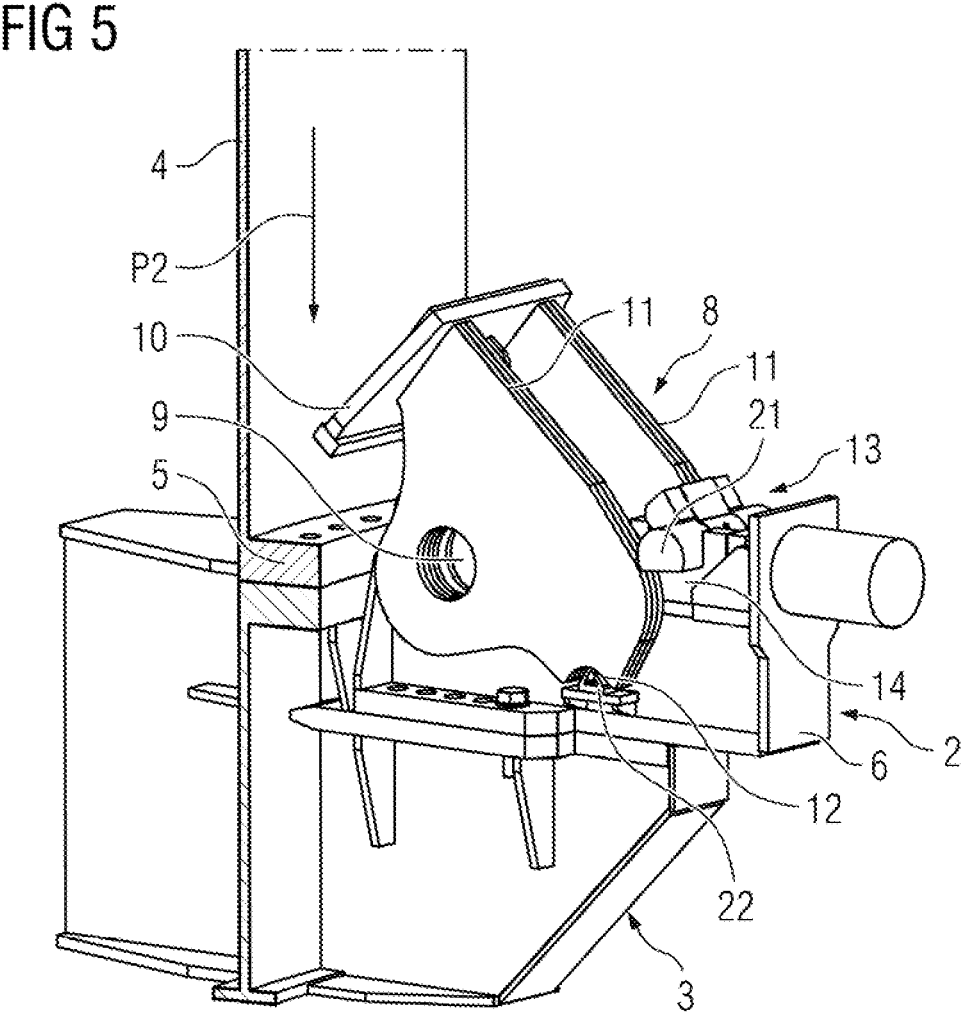
Figure 6:
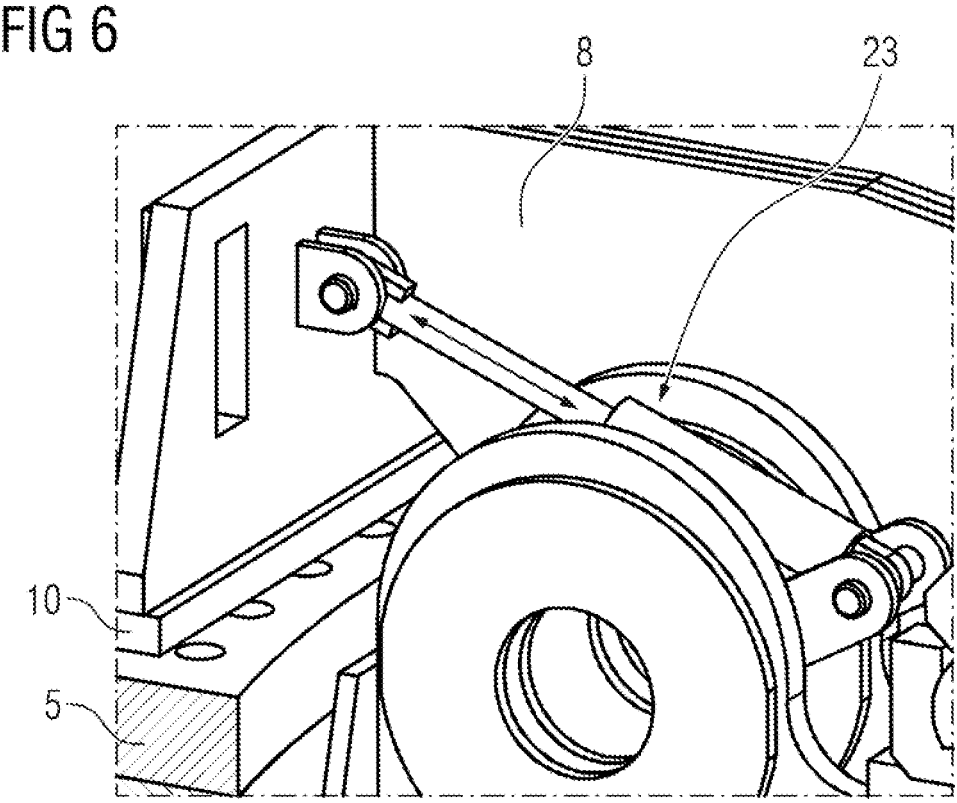
Figure 7:
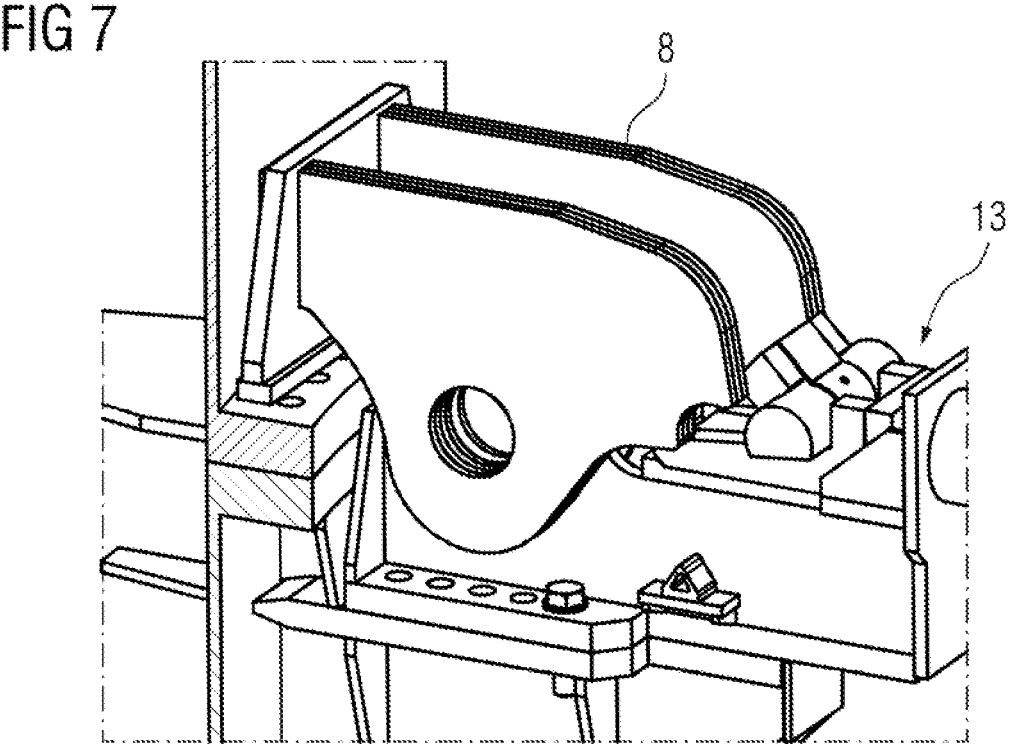
Figure 8:
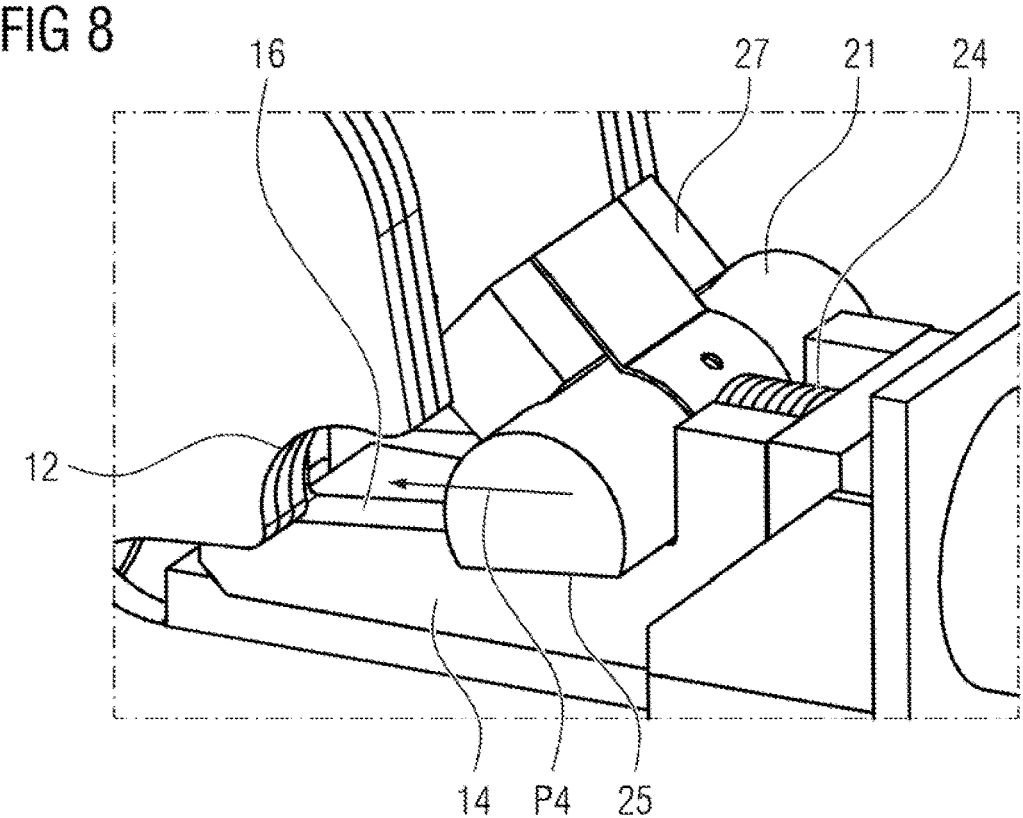
Figure 9:
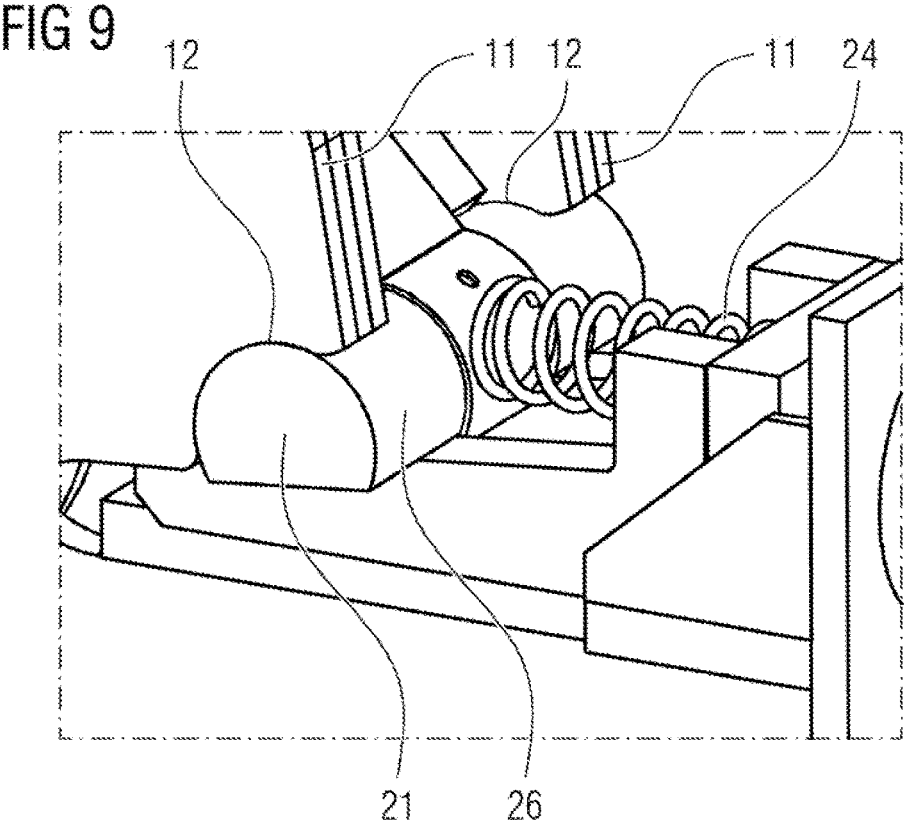
Figure 12:
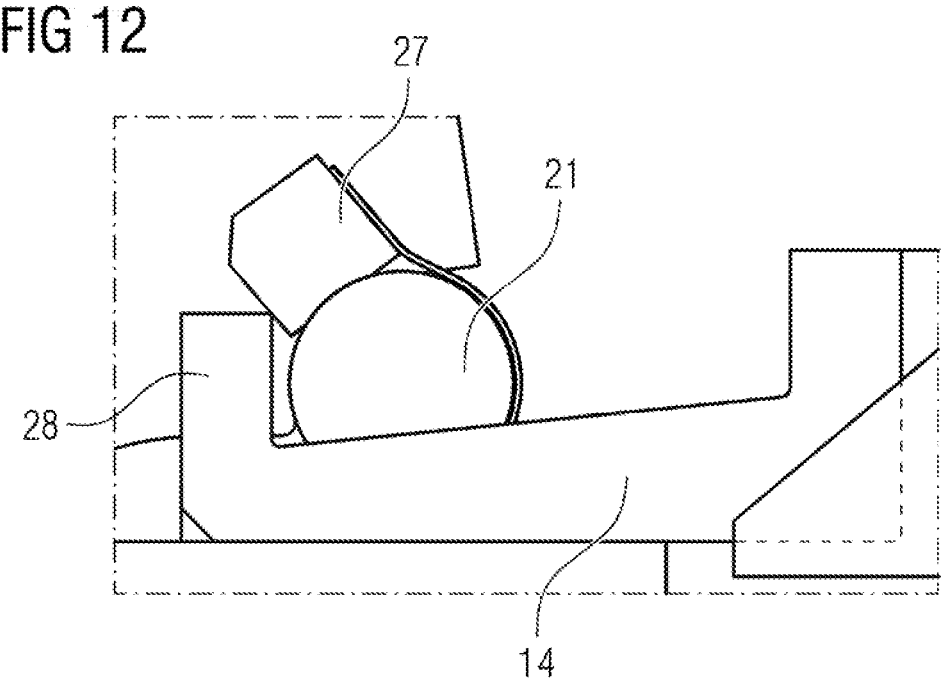
Figure 13:
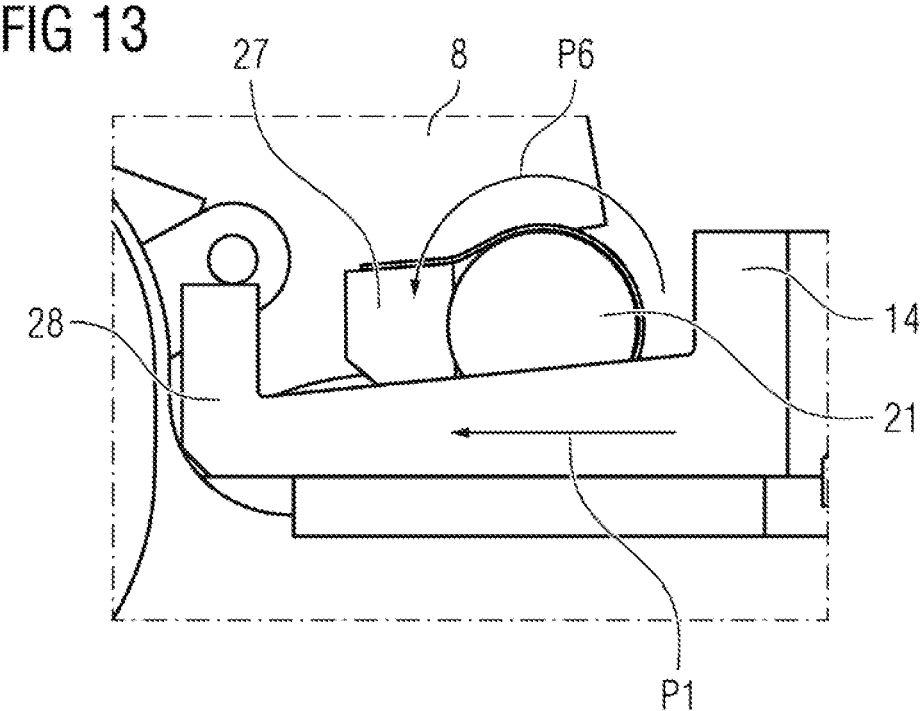
Figure 16:
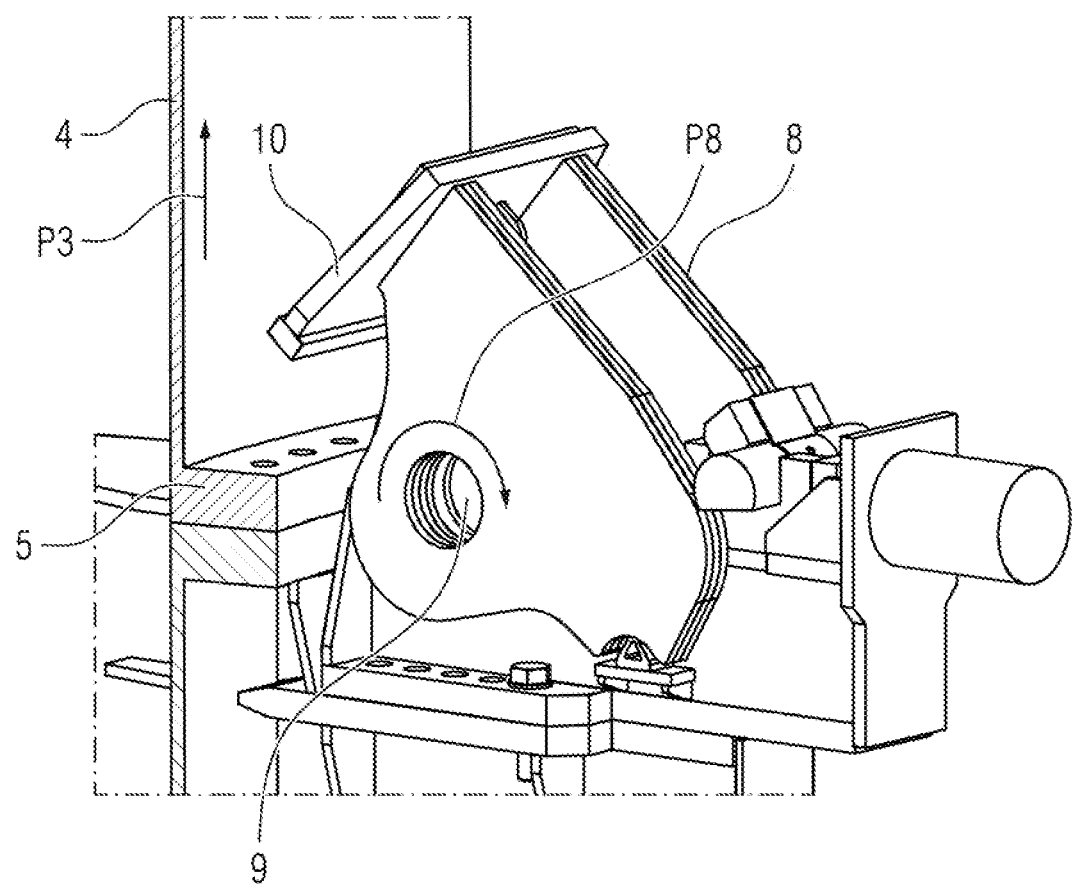

Other objects and features of the present invention will become apparent from the following detailed description considered in conjunction with the accompanying drawings. The drawings, however, are only principle sketches designed solely for the purpose of illustration and do not limit the invention. The drawings show:

FIG. 1 shows a principle sketch of a part of a fixation arrangement of a first embodiment with a fixation means in a position right before the clamping, FIG. 2 the arrangement of FIG. 1 with the fixation means being in the clamping position, FIG. 3 the arrangement of FIG. 2 with the fixation means being released, FIG. 4 a principle sketch of a part of an inventive transport vessel with an inventive fixation arrangement of a second embodiment, FIG. 5 a perspective principle sketch of a fixation means of the fixation arrangement of FIG. 4 in the released position, FIG. 6 a detailed illustration of a part of the fixation means of FIG. 5, FIG. 7 the fixation means of FIG. 5 in a position right before clamping, FIG. 8 an enlarged view of a part of the fixation means of FIG. 7 with the tensioning pin being in the non-working position, FIG. 9 the arrangement of FIG. 8 with the tensioning pin being in the recess engaging position, FIG. 10 a principle sideview sketch of the arrangement of FIG. 9, FIG. 11 the view according to FIG. 10 with a tensioning element being linearly moved, FIG. 12 an enlarged view of the tensioning element/tensioning pin-arrangement with the distance element being in the upper first position, corresponding to FIG. 10, FIG. 13 the arrangement of FIG. 12 with the distance block being in the lower second position, corresponding to FIG. 11, FIG. 14 the tensioning means in the clamping position right before releasing the clamping, FIG. 15 the arrangement of FIG. 14 with the tensioning element being partially moved to the non-clamping position, and the tensioning pin being removed from the recess, and FIG. 16 the fixation means in the released position with the lever arm being gravity driven pivoted around its pivot axis.

FIG. 1 shows a partial illustration of an inventive fixation arrangement 1 comprising several fixation means 2, one of which is shown in FIG. 1. The fixation arrangement 1 certainly comprises a larger number of fixation means 2 which are arranged in a ring-form on a support 3, preferably a grillage, arranged at a not shown transport vessel. The fixation arrangement 1 serves for firmly fixing a tower segment 4 of a wind turbine to the support 3 respectively the vessel. The tower segment 4 may be a monopile or a segment which will be stacked together with several other segments for building the tower. The tower segment comprises an inner flange 5, which provides the engagement section, at which a clamping section of each of the fixation means 2 engages.

Each fixation means 2 comprises a base member 6, which is fixed to the support 3, although not shown. This is done by any screw or bolt fixations attached to respective flanges 7 of the base member 6.

At the base member 6 a lever arm 8 is attached, which is pivotable around a pivot axis 9. The lever arm 8 comprises a clamping section 10, which for clamping purpose is pressed against the flange 5 of the tower section 4 as will be explained in detail.

The lever arm 8 comprises two lever arm plates 11, which are connected to build a stable lever arm. The lever arm 8 respectively each plate 11 is provided with a recess 12, in which a tensioning element will engage for providing the clamping force as will be explained later.

The arrangement of the pivot axis 9 is such that two lever arm sections of different lengths are provided. The first lever arm section extends from the end comprising the recesses 12 to the pivot axis 9 and is the longer section. The second lever arm section extends from the pivot axis 9 to the lever arm end comprising the clamping section 10. This design allows the lever arm 8 to swivel gravity driven around the pivot axis 9 when released by the tensioning means as will be explained later.

Furthermore, the fixation means 2 comprises a tensioning means 13. This tensioning means 13 in this embodiment comprises as tensioning element 14 which is wedge-shaped in cross section. It comprises a bottom surface sliding on the surface 15 of the base member 6. It further comprises a slanted surface 16. The tensioning element 14 is coupled to a hydraulic or pneumatic cylinder means 17 (see FIG. 3), comprising a cylinder 18 fixed to the base member 6 and a movable plunger 19 fixed to the tensioning element 14. By this cylinder means 17 the tensioning element 14 may be moved linearly on the base member 6 to and from the lever arm 8.

The tensioning element 14 is designed to engage the recesses 12 for building up a force which makes the lever arm 8 rotate around the pivot axis 9 and which makes the clamping section 10 to firmly engage the flange 5. As mentioned, the tensioning element 14 has a wedge-like cross section with a slanted surface 16. When the tensioning element 14 moves towards the lever arm 8, as shown by the arrow P1 in FIG. 2, it is moved into the recesses 12. Due to the slanted surface respectively the wedge-like shape, the lever arm 8 is slightly lifted and pivots around the pivot axis 9. The end comprising the clamping section 10 moves downwards, as shown by the arrow P2 in FIG. 2 and is therefore pressed against the flange 5. The deeper the tensioning element 14 is moved into the recesses 12, the higher is the vertical or clamping force which the clamping section 10 urges on the flange 5.

As mentioned, a certain number of fixation elements 2 are arranged in a ring-form. Preferably they are all simultaneously controlled, so that all their cylinder means 17 are simultaneously moving the respective tensioning element 14 into the respective recesses by pulling the plunges 19 into the cylinders 18. All clamping sections 10 of all fixation means 2 are simultaneously pressed against the flange 5, so that the tower section 4 is tightly fixed to the support 3 around its circumference. This allows to securely fasten the tower section to the vessel and for transporting it to the construction site.

At the construction site the tower section 4 needs to be unloaded. It is therefore necessary to again release the clamped fixation.

For this purpose, the tensioning element 14 of each fixation means 2 is moved backwards by the respective cylinder means 17 so that it disengages the respective recesses 12. As mentioned, the respective lever arm sections have different lengths. The longer lever arm section extending from the end comprising the recesses 12 to the pivot axis 9 is heavier than the other lever arm section extending from the pivot axis 9 to the clamping section 10. Therefore, when the tensioning element 14 is moved and disengages the recesses 14, the lever arm 8 swings gravity driven around the pivot axis 9 in an almost upright position as shown in FIG. 3. The clamping section 10 is no longer vertically above the flange 5, so that the tower section 4 may be lifted by a lifting crane, to which it is attached, as shown by the arrow P3.

As again all cylinder means 17 of all fixation means 2 are simultaneously controlled by a respective control means, which controls the hydraulic or pneumatic circuit, each clamping point realised by each separate fixation means 2 is simultaneously released with all other clamping points, so that the tower section 4 is released from one moment to the other around its whole circumference and may therefore immediately be lifted. The whole release process in fact takes only seconds, allowing to release the tower segment 4 even if the vessel is in motion and not jacked-up to the construction site.

For bringing the gravity driven pivoted lever arm 8 from the position according to FIG. 3 to the position according to FIG. 1, in which the recesses 12 are ready to be engaged by the tensioning element 14, for example a not-shown hydraulic or pneumatic cylinder means is provided. This cylinder means lifts the lever arm 8 and pivots it around the pivot axis 9 until it reaches the position according to FIG. 1.

FIG. 4 shows in a principle sketch a vessel 20, to which a fixation arrangement 1 of a second embodiment is attached. The vessel 20 is provided with the support 3, which in this embodiment is a grillage. To this support 3 a larger number of separate fixation means 2 is attached in a ring-form. Also shown is the tower section 4 already arranged on the support 3 and clamped by the fixation means 2, which are designed according to a second embodiment as explained below.

FIG. 5 shows a principle enlarged view of the fixation means 2 attached to the support 3. The same reference numbers are used for the same items, as far as possible. The fixation means 2 again comprises a base member 6, to which a lever arm 8 comprising two plates 11 is attached and may swivel around a pivot axis 9, comparable to the first embodiment. The lever arm 8 again comprises a clamping section 10 which when necessary clamps on a flange 5 of the tower section 4. This is illustrated by the arrow P2 also shown in this figure. Also in this embodiment a tensioning means 13 is provided, comprising a linearly movable tensioning element 14 supported on the base member 2 and having a slanted surface 16 (see for example FIG. 8). The tensioning means 13 further comprises a tensioning pin 21 which moves on the slanted surface 16 and engages the respective recesses 12 at the lever arm 8. The tensioning pin 21 is the intermediate force transfer element for transferring the force provided by the moving tensioning element 14 to the lever arm 8 as will be explained later.

The lever arm 8 again comprises respective recesses 12 arranged at both plates 11. In the non-working position of the lever arm 8, as shown in FIG. 5, the lever arm 8 abuts respective block elements 22 arranged at the base member 6, which define the final non-working position of the lever arm 8.

As FIG. 6 shows, the lever arm 8 is connected to a hydraulic or pneumatic cylinder means 23 used for moving the lever arm 8 preferably in both directions. Especially it is used for moving the lever arm 8 from the non-working position shown in FIG. 5 into a position, in which the clamping section 10 is positioned vertically above the flange 5 of the tower section 4 bunt not yet clamped.

In this embodiment, the cylinder means 23 may also be used to move the lever arm 8 back to the non-working position according to FIG. 5 after the clamping is released again. So, in this embodiment the lever arm 8 is not gravity driven as is the lever arm 8 of the first embodiment according to FIGS. 1-3, but is actively moved between the respective positions.

FIG. 7 shows the position of the lever arm 8, into which it is brought by the cylinder means 23 and before the tensioning means 13 is activated. For finally clamping the lever arm 8, the tensioning pin 21 first needs to linearly move on the tensioning element 14 respectively its slanted surface 16. The tensioning pin 21 is biased by a spring means 24, preferably a helical spring, which is shown in principle in FIGS. 8 and 9. The tensioning pin 21 may be locked by a controllable locking pin not shown in detail in the position retracted respectively compressing the spring means 24. When the clamping shall be realised, this locking is released, so that the spring means 24 can move the tensioning pin 21 on the slanted surface 16 until it engages the recesses 12, as shown in FIGS. 8 and 9. This linear movement is shown by the arrow P4 in FIG. 8.

The tensioning pin 21 is basically of a cylindrical cross section, but has a flat bottom surface 25, with which it slides on the slanted surface 16. A respective sliding surface or sliding bearing arrangement may be provided to ease the sliding movement. The recesses 12 are also rounded, so that, see FIG. 9, the tensioning pin engages in a form fit manner with its cylindrical surface 26 into the respective rounded recesses. This ascertains that the contact surface between the transmitting tensioning pin 21 and the recesses 12 does not change during the clamping process, in which the lever arm 8 is slightly pivoted around its pivot axis 9 and therefore changes its relative position to the tensioning pin 9. So any local load peaks may be avoided and there is always a constant load distribution.

FIG. 10 shows in principle the tensioning means 13 with the wedge-like tensioning element 14 and the tensioning pin 21 engaging the recesses 12. The tensioning element 14 again is coupled to the cylinder means 17. For pivoting the lever arm 8 around its pivot axis 9, the cylinder means 17 moves the tensioning element 14 linearly as shown by the arrow P1 in FIG. 11. The tensioning element. 14 again is supported on the base member 6 and slides on it.

Due to this linear movement, see the FIGS. 11 and 12, the tensioning pin 21, which is fixed in the recesses 12, moves on the slanted surface 16 and, as the surface 16 rises slightly, is therefore lifted and pressed against the lever arm 8, which is lifted as shown by the arrow P5 on this lever arm side, while the other lever arm side is lowered according to the arrow P2 shown in FIG. 2, so that the clamping section 10 is pressed against the tower section flange 5.

As FIG. 12 further shows, the tensioning pin 21 comprises a distance element 27 which is rotatably arranged at the tensioning pin 21. This distance element is movable from an upper first position according to FIG. 12 in a lower second position according to FIG. 13, as shown by the arrow P6. When the tensioning pin 21 has engaged the respective recesses 12, the tensioning element 14 is still in the retracted position according to FIG. 10. The distance element 24 is in the lifted first position. It is arranged between the plates 11, as shown in FIG. 9.

Between these plates 11 also a catch 28, which is provided at the tensioning element 14, is arranged.

From the position according to FIG. 12 the tensioning element 14 is then moved linearly according to arrow P1, so that the tensioning pin 21 is pressed against the lever arm 8, which in turn is lifted and pivoted as already mentioned. During this operation the distance element 27 pivots from the first position to the second position according to FIG. 14, in which it is arranged in the gap between the tensioning pin 21 and the catch 28. This movement may be realised for example by a forced guidance by which the distance element 27 may be coupled to the tensioning element 14. Its bridges this gap to a certain extend.

If now the clamping of the tower segment shall be released for unloading it, the lifting element 14 is retracted again as shown by the arrow P7 in FIG. 14, thereby releasing the pressure the tensioning pin 21 urges on the lever arm 8. The catch 28 is moved towards the distance element 27 and abuts the distance element 27 as shown in FIG. 15. By further moving the tensioning element 14 the catch 28 moves the tensioning pin 21 together with the distance element 27 (which has disengaged the forced guidance) from its engagement of the recesses 12, thereby releasing the lever arm 8, which can now be moved by the cylinder means 23 from this former clamping position to the non-working position according to FIG. 5.

Obviously the distance element 27 allows for a very quick release of the clamping of the tower section, as it necessitates only a very small movement of the tensioning element 14 to abut the distance element 27 and to move the tensioning pin 21, which is the only item engaging in the recesses 12, so that the release is overall very fast and can be realised within seconds. As again all fastening means 2 are simultaneously controlled, meaning that all their respective cylinder means 17 and 23 are simultaneously controlled by a control means according to the respective process situation, the releasing or unclamping process is simultaneously performed around the whole circumference, so that all clamping points are opened at the same time and the tower section may immediately be lifted.

This lifting operation is finally shown in FIG. 16, which shows the lever arm 8 pivoted around its pivot axis 9, as shown by the arrow P8. It is obvious that in this position the clamping section 10 is no longer vertically above the flange 5 of the tower section 4, so that the tower section 4 may be lifted as shown by the arrow P3. The process cycle, starting from loading the tower segment 4 on the support 3 of the vessel 20 and fixing it with a fixation arrangement 1, has now ended. The system respectively the fixation arrangement is ready for loading a new tower section, which new cycle again starts as explained in detail for the first embodiment according to FIGS. 1-3 respectively the second embodiment according to the FIGS. 5-16.

Although the present invention has been described in detail with reference to the preferred embodiment, the present invention is not limited by the disclosed examples from which the skilled person is able to derive other variations without departing from the scope of the invention.

The invention claimed is:

1. A fixation arrangement adapted to releasably fix a wind turbine tower segment to a support of a transport vessel, the fixation arrangement comprising a plurality of fixation means, wherein each of the fixation means comprises a base member fixable to the support and each of the fixation means comprises:
   a) a lever arm connected to the base member and pivotable around a pivot axis, the lever arm comprising two sections, a first section extending from a first end of the lever arm to the pivot axis and a second section extending from the pivot axis to a second end of the lever arm, the second section comprising clamping means for clamping to a flange of the wind turbine tower segment when the clamping means is directly above the flange, the base member with lever arm being fixable on the support in a desired position wherein, solely by pivoting the lever arm around the pivot axis, the lever arm is movable from a non-clamping position wherein the lever arm is not disposed above the flange to a clamping position wherein the clamping means of the lever arm is disposed directly above the flange so as to enable the clamping means to clamp onto the flange;
   b) at least one tensioning element configured for directly or indirectly engaging with the lever arm; and
   c) means for moving the at least one tensioning element linearly along the base member in a horizontal direction toward and away from the lever arm;
   wherein, with the base member and lever arm fixed on the support in the desired position, the at least one tensioning element and lever arm are configured and arranged with respect to one other such that (i) a force applied by the moving means to move the at least one tensioning element toward the lever arm causes the at least one tensioning element to engage the lever arm with the lever arm in the non-clamping position and to apply to the lever arm a force consisting of an angular force that causes the lever arm to rotate around the pivot axis from the non-clamping position to the clamping position, and (ii) a force applied by the moving means to move the at least one tensioning element away from the lever arm causes the clamping means to disengage from the support and the lever arm to swing around the pivot axis to a position wherein the lever arm is nearer to upright than horizontal such that the wind turbine tower segment can be released and lifted from the support without interference from the lever arm.

2. The fixation arrangement according to claim 1, wherein the at least one tensioning element is releasably movable into at least one recess provided at the lever arm, wherein the at least one tensioning element and the recess comprise interacting surfaces with at least one of the interacting surfaces being slanted, so that by the interaction of the surfaces during the movement of the at least one tensioning element into the at least one recess the lever arm is pivoted around the pivot axis.

3. The fixation arrangement according to claim 2, wherein the recess is provided at a first end of the lever arm and the clamping section is arranged at a second end of the lever arm, with the pivot axis being arranged between the first end and the second end.

4. The fixation arrangement according to claim 3, wherein the pivot axis is arranged closer to the second end than to the first end.

5. The fixation arrangement according to claim 2, wherein the lever arm is movable by means of a controllable hydraulic or pneumatic cylinder from the non-working position into a position allowing the movement of the at least one tensioning element or the tensioning pin into the recess.

6. The fixation arrangement according to claim 1, wherein the at least one tensioning element comprises a slanted surface, wherein the at least one tensioning element further comprises a tensioning pin movable on the slanted surface of the at least one tensioning element from a non-engaging position into an engaging position, in which the at least one tensioning element engages at least one recess provided at the lever arm, wherein the at least one tensioning element, when moved from the non-clamping position into the clamping position, interacts with the tensioning pin which in turn interacts with the lever arm.

7. The fixation arrangement according to claim 6, wherein the tensioning pin is cylindrical with a flat bottom surface sliding on the slanted surface, and the recess is at least in part adapted to the cylindrical surface of the tensioning pin.

8. The fixation arrangement according to claim 6, wherein the at least one tensioning element comprises a catch adapted to disengage the tensioning pin from the recess when the at least one tensioning element moves from the clamping position to the non-clamping position.

9. The fixation arrangement according to claim 8, wherein the tensioning pin comprises a distance element rotatably arranged at the tensioning pin and adapted to rotate from a first lifted position to a second lowered position in which it is arranged between the tensioning pin and the catch.

10. The fixation arrangement according to claim 8, wherein the tensioning pin is moved by an elastic spring from the non-engaging position to the engaging position or that the distance element is automatically moved from the first lifted position to in the second lower position and back by a mechanical forced guidance or both.

11. The fixation arrangement according to claim 1, wherein the at least one tensioning element has a wedge-like cross section comprising a bottom surface and a top surface, wherein the top surface is a slanted surface.

12. The fixation arrangement according to claim 11, wherein the slanted surface is angled under 1°-5°.

13. The fixation arrangement according to claim 1, wherein the at least one tensioning element is movably supported on the base member.

14. The fixation arrangement according to claim 1, wherein the at least one tensioning element is movable by of a controllable hydraulic or pneumatic cylinder.

15. The fixation arrangement according to claim 1, wherein the lever arm is adapted to be driven by gravity to move around the pivot axis from the clamping position into the non-clamping position when being released from the at least one tensioning element.

16. The fixation arrangement according to claim 1, wherein the lever arm is movable by hydraulic or pneumatic cylinder from the clamping position into the non-clamping position after removing the at least one tensioning element or the tensioning pin from the recess and from the non-clamping position into a position allowing movement of the at least one tensioning element or the tensioning pin into the recess.

17. The fixation arrangement according to claim 1, wherein the support is a grillage to which each of the fixation means is fixed.

18. The fixation arrangement according to claim 1, wherein each of the fixation means is linearly and radially movable.

19. A transport vessel, comprising the fixation arrangement according to claim 1.

20. A method for transporting a wind turbine tower segment with a transport vessel, the method comprising the steps of:
(i) providing the fixation arrangement according to claim 1,
(ii) positioning the wind turbine tower section is on the support of the vessel,
(ii) positioning the plurality of fixation means of the fixation arrangement on the transport vessel relative to the support such that the plurality of fixation means can be fixed to the support by moving the at least one tensioning element of each of the plurality of fixation means from the non-clamping position into the clamping position, thereby clamping the lever arm of each of the plurality of fixation means against an engagement section of the wind turbine tower segment, and such that the plurality of fixation means can be released from the support by moving the at least one tensioning element of each of the plurality of fixation means from the clamping position into the non-clamping position, thereby releasing the clamping of the lever arm of each of the plurality of fixation means.

21. The method according to claim 20, comprising controlling the at least one tensioning element and the lever arm of each of the plurality of fixation means so that the lever arms either pivot gravity driven from the clamping position into the non-clamping position or are automatically moved by cylinder means from the clamping position into the non-clamping position.

22. The method according to claim 21, comprising controlling the cylinder means of each of the fixation means simultaneously.

* * * * *